United States Patent
Chien et al.

(10) Patent No.: US 12,081,992 B2
(45) Date of Patent: *Sep. 3, 2024

(54) MULTI-FACTOR AUTONOMOUS SIM LOCK

(71) Applicant: AT&T Intellectual Property I, L.P., Atlanta, GA (US)

(72) Inventors: Ginger Chien, Bellevue, WA (US); Richard Zaffino, Kirkland, WA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/065,302

(22) Filed: Dec. 13, 2022

(65) Prior Publication Data

US 2023/0114114 A1 Apr. 13, 2023

Related U.S. Application Data

(63) Continuation of application No. 17/211,265, filed on Mar. 24, 2021, now Pat. No. 11,558,751, which is a
(Continued)

(51) Int. Cl.
*H04W 12/00* (2021.01)
*H04L 9/40* (2022.01)
(Continued)

(52) U.S. Cl.
CPC ......... *H04W 12/72* (2021.01); *H04L 63/0853* (2013.01); *H04L 63/0861* (2013.01);
(Continued)

(58) Field of Classification Search
CPC ........... H04W 12/00514; H04W 12/06; H04W 12/00506; H04W 12/00502; H04W 12/00503; H04L 63/0853; H04L 63/0861
See application file for complete search history.

(56) References Cited

U.S. PATENT DOCUMENTS 6,124,799 A 9/2000 Parker et al.
6,321,079 B1 11/2001 Cooper
(Continued)

FOREIGN PATENT DOCUMENTS

WO 03007538 A1 1/2003
WO 2007050272 A2 5/2007
(Continued)

OTHER PUBLICATIONS

Zhukovskyy et al., "Method of Forensic Analysis for Compromising Carrier-lock Algorithm on 3G Modem Firmware," 2019 IEEE 2nd Ukraine Conference on Electrical and Computer Engineering (UKRCON) Year: 2019 | Conference Paper | Publisher: IEEE.*
(Continued)

*Primary Examiner* — Roderick Tolentino
(74) *Attorney, Agent, or Firm* — Guntin & Gust, PLC; Kenneth S. Kwan

(57) ABSTRACT

Aspects of the subject disclosure may include, for example, initializing a secure timer in a wireless device, determining whether a subscriber identification module (SIM) card installed in the wireless device comprises a carrier identity that matches a carrier identity stored in the machine-readable medium, establishing a network connection with a trusted server, starting the secure timer if the SIM card and network connection are satisfactory, periodically checking the network connection and SIM card until expiry of the secure timer, penalizing the secure timer responsive to a failure of the network connection or SIM card check, and responsive to expiry of the secure timer, unlocking a SIM lock. Other embodiments are disclosed.

20 Claims, 8 Drawing Sheets

Related U.S. Application Data continuation of application No. 16/289,756, filed on Mar. 1, 2019, now Pat. No. 10,993,107.

(51) Int. Cl.
| | | |
|---|---|---|
| *H04L 29/06* | (2006.01) | |
| *H04W 12/06* | (2021.01) | |
| *H04W 12/60* | (2021.01) | |
| *H04W 12/61* | (2021.01) | |
| *H04W 12/64* | (2021.01) | |
| *H04W 12/72* | (2021.01) | |

(52) U.S. Cl.
CPC ........... *H04W 12/06* (2013.01); *H04W 12/61* (2021.01); *H04W 12/64* (2021.01); *H04W 12/66* (2021.01)

(56) References Cited

U.S. PATENT DOCUMENTS

| | | | |
|---|---|---|---|
| 7,088,988 | B2 | 8/2006 | Kelkar et al. |
| 7,886,355 | B2 | 2/2011 | Rager |
| 8,209,550 | B2 | 6/2012 | Gehrmann |
| 8,555,077 | B2 | 10/2013 | Davis et al. |
| 8,774,864 | B2 | 7/2014 | Kumar |
| 9,258,708 | B2 | 2/2016 | Fan et al. |
| 9,456,349 | B2 | 9/2016 | Kim et al. |
| 9,699,660 | B1 | 7/2017 | Blatt et al. |
| 9,788,209 | B2 | 10/2017 | Hauck et al. |
| 9,807,607 | B2 | 10/2017 | Velusamy |
| 9,813,399 | B2 | 11/2017 | Velusamy |
| 9,813,912 | B2 | 11/2017 | Kovacevic |
| 10,567,953 | B1* | 2/2020 | Kumar .................. H04W 88/06 |
| 2005/0037732 | A1 | 2/2005 | Kotzin |
| 2009/0191846 | A1 | 7/2009 | Shi |
| 2010/0095364 | A1* | 4/2010 | Norgaard ................ H04L 63/12 |
| | | | 726/9 |
| 2014/0018131 | A1 | 1/2014 | Yao et al. |
| 2014/0045454 | A1* | 2/2014 | Monjas Llorente ... G06Q 20/02 |
| | | | 455/406 |
| 2015/0289134 | A1* | 10/2015 | Johnston ................. H04L 51/24 |
| | | | 380/270 |
| 2016/0100309 | A1* | 4/2016 | Velusamy ......... H04W 12/1204 |
| | | | 380/270 |
| 2017/0085546 | A1* | 3/2017 | Velusamy ............... H04L 63/08 |
| 2017/0185538 | A1 | 6/2017 | Khan et al. |
| 2017/0230515 | A1* | 8/2017 | Velusamy ............... H04W 4/24 |
| 2017/0289804 | A1* | 10/2017 | Kovacevic ........... H04L 63/102 |
| 2018/0352529 | A1* | 12/2018 | Kumar .................. H04W 60/04 |
| 2019/0150060 | A1* | 5/2019 | Lovlekar ............... H04W 48/02 |
| | | | 455/418 |
| 2020/0245128 | A1* | 7/2020 | Obaidi .................. H04W 8/183 |
| 2020/0280847 | A1 | 9/2020 | Chien et al. |
| 2021/0211882 | A1 | 7/2021 | Chien et al. |

FOREIGN PATENT DOCUMENTS

| | | |
|---|---|---|
| WO | 2013008048 A1 | 1/2013 |
| WO | 2016123926 A1 | 8/2016 |
| WO | 2017101571 A1 | 6/2017 |
| WO | 2018047203 A1 | 3/2018 |

OTHER PUBLICATIONS

Tambe et al., "Offline Mobile Security," 2018 International Conference on Smart City and Emerging Technology (ICSCET) Year: 2018 | Conference Paper | Publisher: IEEE.*

"Cell Phone Unlocking", https://web.archive.org/web/20160229135219/ https://www.fcc.gov/general/cell-phone-unlocking, Feb. 29, 2016, 2 pages.

Marrello, Byron, "Unlocking the Competitiveness of the Fee: Is Canadian Mobile Service Providers Charging a Fee to Remove the Software Lock after the Contract Expires Anti-competitive?", https://tspace.library.utoronto.ca/bitstream/1807/33442/3/Marrello_Byron_T_201211_LLM_Thesis.pdf, 2012, 72 pages.

Tambe, Vishal et al., "Offline Mobile Security", 2018 International Conference on Smart City and Emerging Technology (ICSCET), 2018, 4 pages.

Zhukovskyy, Viktor et al., "Method of Forensic Analysis for Compromising Carrier-lock Algorithm on 3G Modem Firmware", 2019 IEEE 2nd Ukraine Conference on Electrical and Computer Engineering (UKRCON), 2019, 4 pages.

* cited by examiner

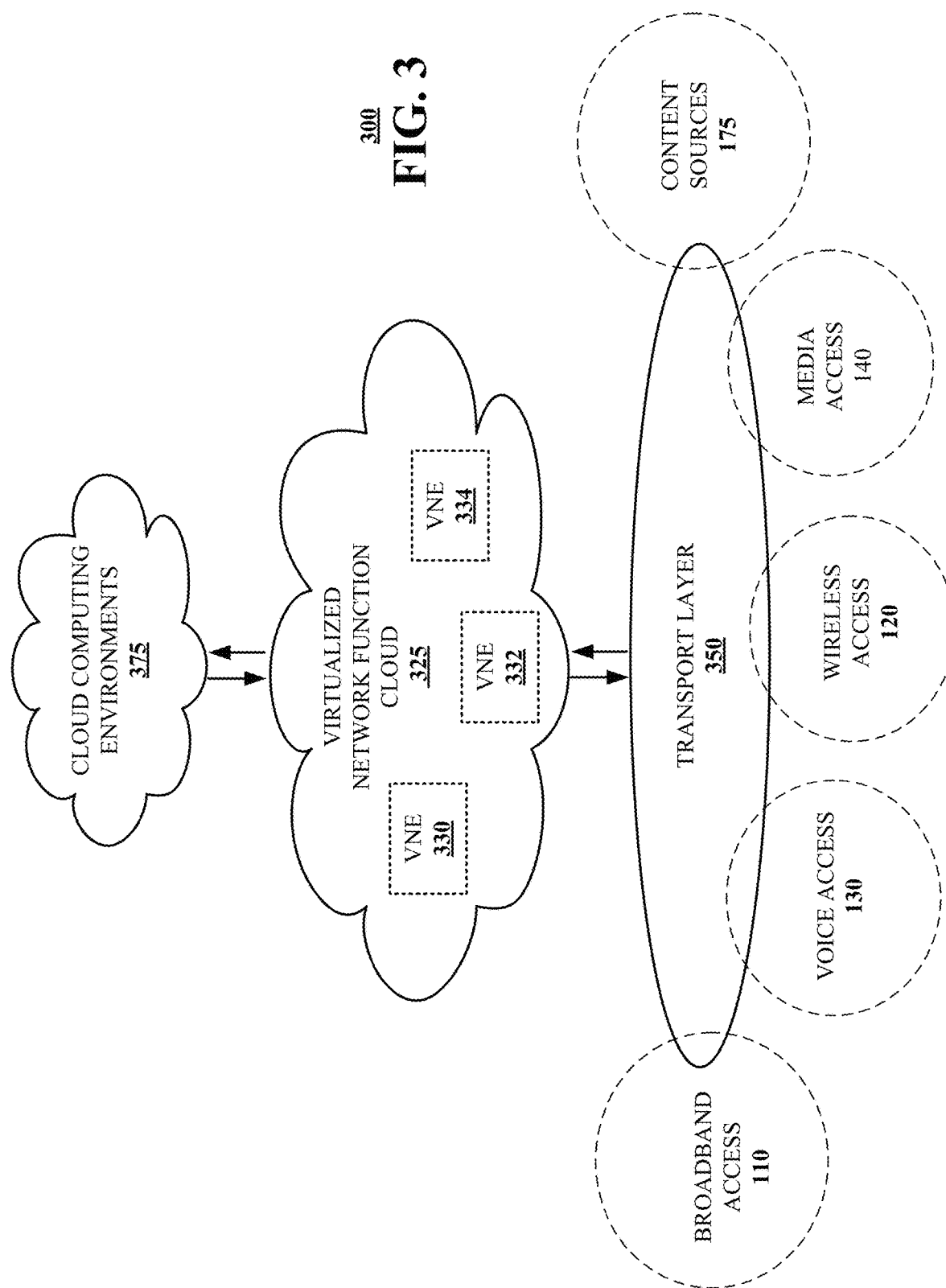

MULTI-FACTOR AUTONOMOUS SIM LOCK

CROSS-REFERENCE TO RELATED APPLICATIONS

This application is a continuation of and claims priority to U.S. application Ser. No. 17/211,265, filed Mar. 24, 2021, which is a continuation of and claims priority to U.S. application Ser. No. 16/289,756, filed Mar. 1, 2019 (now U.S. Pat. No. 10,993,107). The contents of the foregoing are hereby incorporated by reference into this application as if set forth herein in full.

FIELD OF THE DISCLOSURE

The subject disclosure relates to a system and method for ensuring use of a designated subscriber identification module (SIM) card using a SIM lock on a wireless device.

BACKGROUND

Many network carriers offer phones at a discount to customers in exchange for a contract to pay for the use of the network for a specified time period. This business model allows the carrier to recoup the cost of the phone over the life of the contract. However, theft of such subsidized phones remains a large problem. Current technologies involve 3rd Generation Partnership Project (3GPP) industry-standard "unlock codes." A phone owner requests the unlock code from the carrier, which is readily supplied if certain financial obligations have been met. Unlock codes suffer from technology and/or supply chain weaknesses that result in black market sales of unlock codes for a fraction of the phone's value. Over time, hackers have derived unlock codes by compromising algorithms, unlock codes have been stolen, and backdoor methods around the unlock code scheme have been discovered.

Legacy and new solutions rely on secure memory on phones (devices) that cannot be penetrated except by extremely skilled hackers with time and hardware resources. This memory may include secret keys, codes, logic that can access and set or unset the SIM lock setting. New solutions involve more sophisticated versions of trusted logic and factory-embedded secret keys in the highly secure areas of devices where sole control over the SIM unlock functionality resides. These solutions add more logic, more secret keys, and network connectivity that allow the user to use an app that signals the underlying logic to send an unlock request hashed with secure keys to a network server upon which the server decrypts the ID and determines if the subscriber has met financial obligations. If so, a similarly encrypted unlock authorization is sent to the device's trusted code to cause it to unlock the device to allow any SIM to be used. Although these solutions are robust, they require a network server and manufacturing processes that involve injecting additional code and unique identifiers into the trusted/secure memory location of each device. They also require a network service that determines unlock eligibility.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein;

DETAILED DESCRIPTION

The subject disclosure describes, among other things, illustrative embodiments for implementing logic to ensure use of a carrier SIM card. Other embodiments are described in the subject disclosure.

One or more aspects of the subject disclosure include a wireless device that includes a processing system including a processor; and a memory that stores executable instructions that, when executed by the processing system, facilitate performance of operations, such as initializing a secure timer; determining that a valid subscriber identification module (SIM) card is installed in the wireless device, resulting in a first determination; determining that a network connection has been established between the wireless device and a trusted server, resulting in a second determination; starting the secure timer if both the first determination and the second determination are true; penalizing the secure timer if the first determination or the second determination are false; repeating the first determination, the second determination, and the penalizing steps until expiry of the secure timer; and responsive to expiry of the secure timer, unlocking a SIM lock.

One or more aspects of the subject disclosure include initializing a secure timer in a wireless device, determining whether a subscriber identification module (SIM) card installed in the wireless device comprises a carrier identity that matches a carrier identity stored in the machine-readable medium, establishing a network connection with a trusted server, starting the secure timer if the SIM card and network connection are satisfactory, periodically checking the network connection and SIM card until expiry of the secure timer, penalizing the secure timer responsive to a failure of the network connection or SIM card check, and responsive to expiry of the secure timer, unlocking a SIM lock One or more aspects of the subject disclosure include a method, comprising: initializing, by a processing system including a processor, a secure timer; determining, by the processing system, whether a subscriber identification module (SIM) card installed in a wireless device comprises a carrier identity that matches a carrier identity, resulting in a first determination; establishing, by the processing system, a network connection with a trusted server, resulting in a second determination; starting, by the processing system, the secure timer responsive to the first determination and the second determination; periodically repeating the determining and establishing steps, by the processing system, until expiry of the secure timer, and penalizing the secure timer responsive to a failure of the first determination or the second determination; and responsive to expiry of the secure timer, unlocking, by the processing system, a SIM lock.

Figure 1:
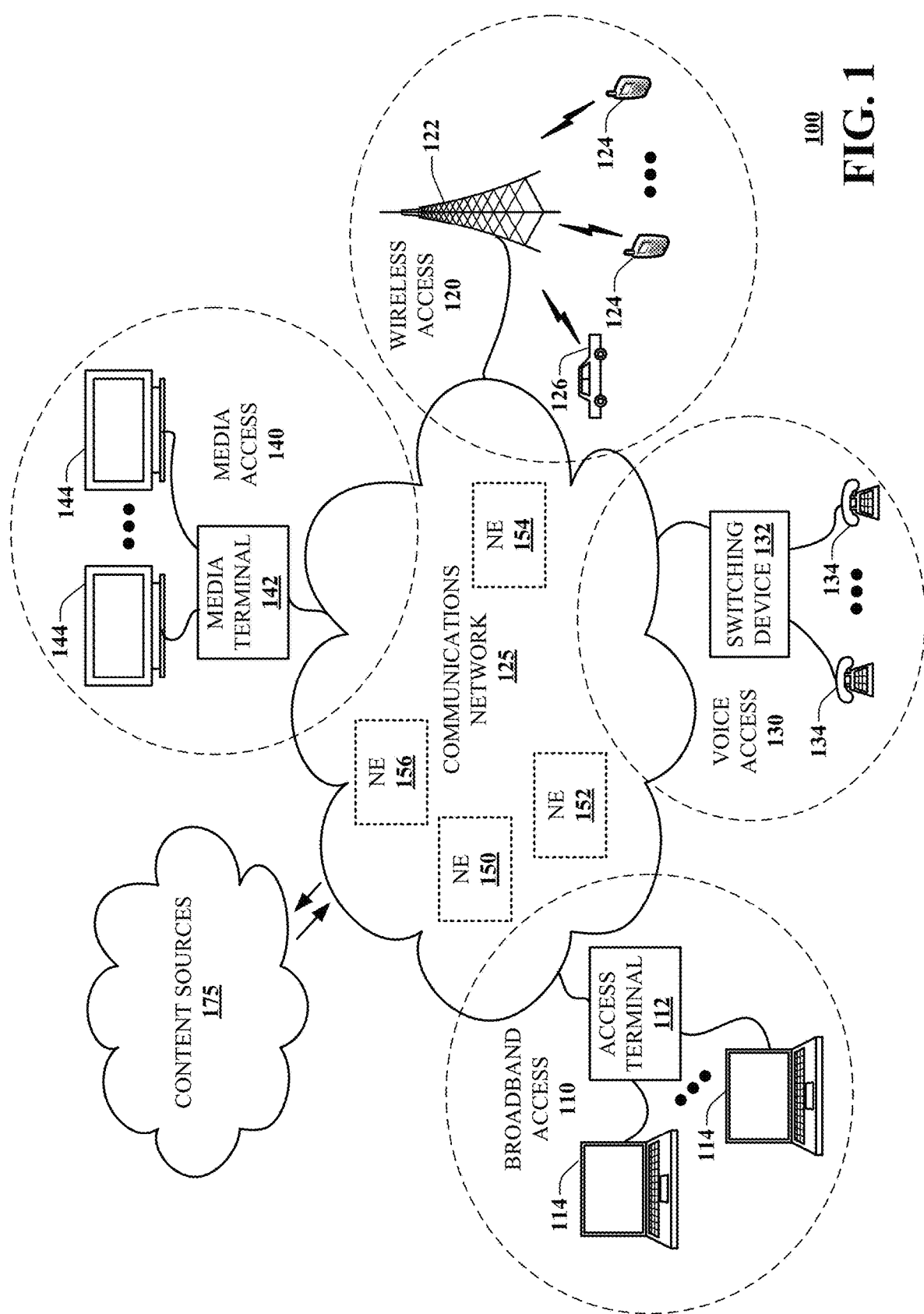
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a communications network 100 in accordance with various aspects described herein. For example, communications network 100 can facilitate in whole or in part providing communication services to the wireless device. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
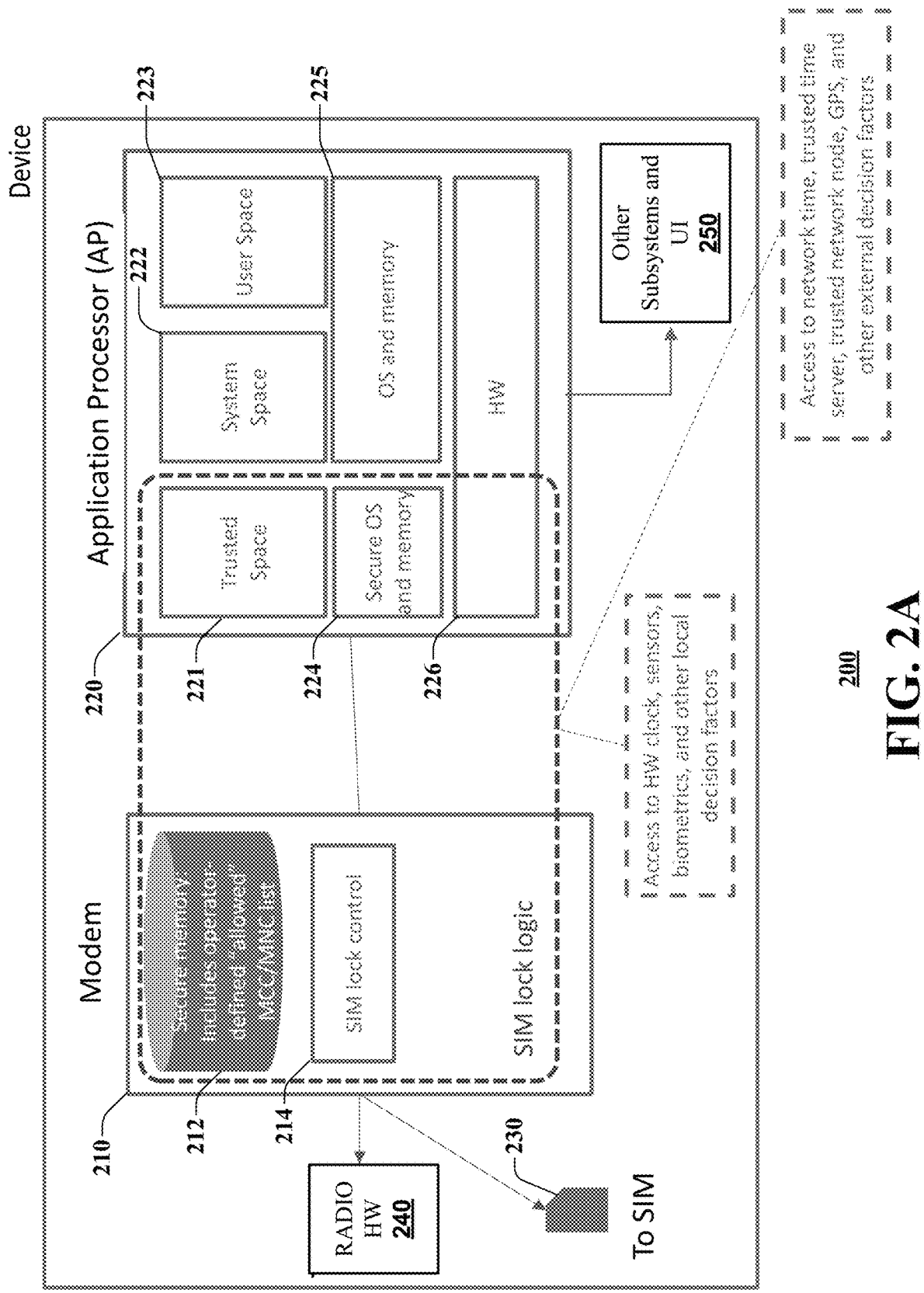
FIG. 2A is a block diagram illustrating an example, non-limiting embodiment of a wireless device functioning within the communication network of FIG. 1 in accordance with various aspects described herein.

FIG. 2A is a block diagram illustrating an example, non-limiting embodiment of a wireless device functioning within the communication network of FIG. 1 in accordance with various aspects described herein. As illustrated in FIG. 1, the wireless device 200 comprises a modem 210, an application processor 220, a SIM card 230, radio hardware 240 and other subsystems, including a user interface (UI) 250.

The modem 210 comprises a secure memory 212. Secure memory 212 in modem 210 requires substantial skill to hack due to its obscurity, and often requires proprietary original equipment manufacturer (OEM) knowledge to do so. Located in the secure memory 212 is important "SIM lock control" logic 214 and operator-defined SIM lock settings. SIM lock control logic 214 enables or disables fully connected services depending on alignment of carrier identity in SIM card, allowed carrier identities securely burned in the modem, and carrier identity announced by the prospective network to which the device wants to attach itself. Carrier identity is typically represented by the Mobile Country Code/Mobile Network Code, which are allocated by a global standards authority.

The application processor 220 comprises various program execution spaces, including a trusted space 221, a system space 222, and a user space 223. These spaces vary in security and tamper-resistance from high to low. The application processor 220 further comprises a secure operating system (OS) and memory 224, an OS and memory 225, and hardware 226. In another embodiment, the secure memory 212 resides in a system on a chip (SOC) comprising both the modem 210 and the application processor 220. In another embodiment, the secure memory 212 can be located in components entirely separate from the modem 210 and the application processor 220, or even part of an SOC, but can reside in a sufficiently secure location in device 200 where memory and processing are sufficiently secure to realize protection mechanisms, such as those described herein.

The SIM lock logic can be implemented in one or more of the aforementioned program execution spaces. However, for security reasons as much of the SIM lock logic would be placed in the secure memory 212 of the modem 210. In an embodiment, the SIM lock logic is shown by a dashed red box, which is spread across the more secure spaces of the modem 210 and the application processor 220. If the sensitive data, code, and logic are secured sufficiently by the security capabilities of where they are stored, then all of the ancillary functions, such as a friendly UI, can be freely implemented in weaker areas, such as user space 223, without loss of essential security. The SIM lock logic observes various factors, and executes logic to determine eligibility for unlock, unlocks the device either automatically or on user request if the device qualifies for unlock, and causes the SIM lock control to influence connectivity in accordance with the lock/unlock state, inserted SIM, available network, and burned-in allowed SIM list.

Not illustrated in FIG. 2A are incidental blocks of device hardware and software, such as a graphics processor, memory, display, UI, sensors, etc. Many of these blocks are described in connection with FIG. 6 below. Modem 210 and application processor 220 may be implemented on separate chips, or may exist on one chip, i.e., a System-on-Chip (SOC).

Figure 2B:
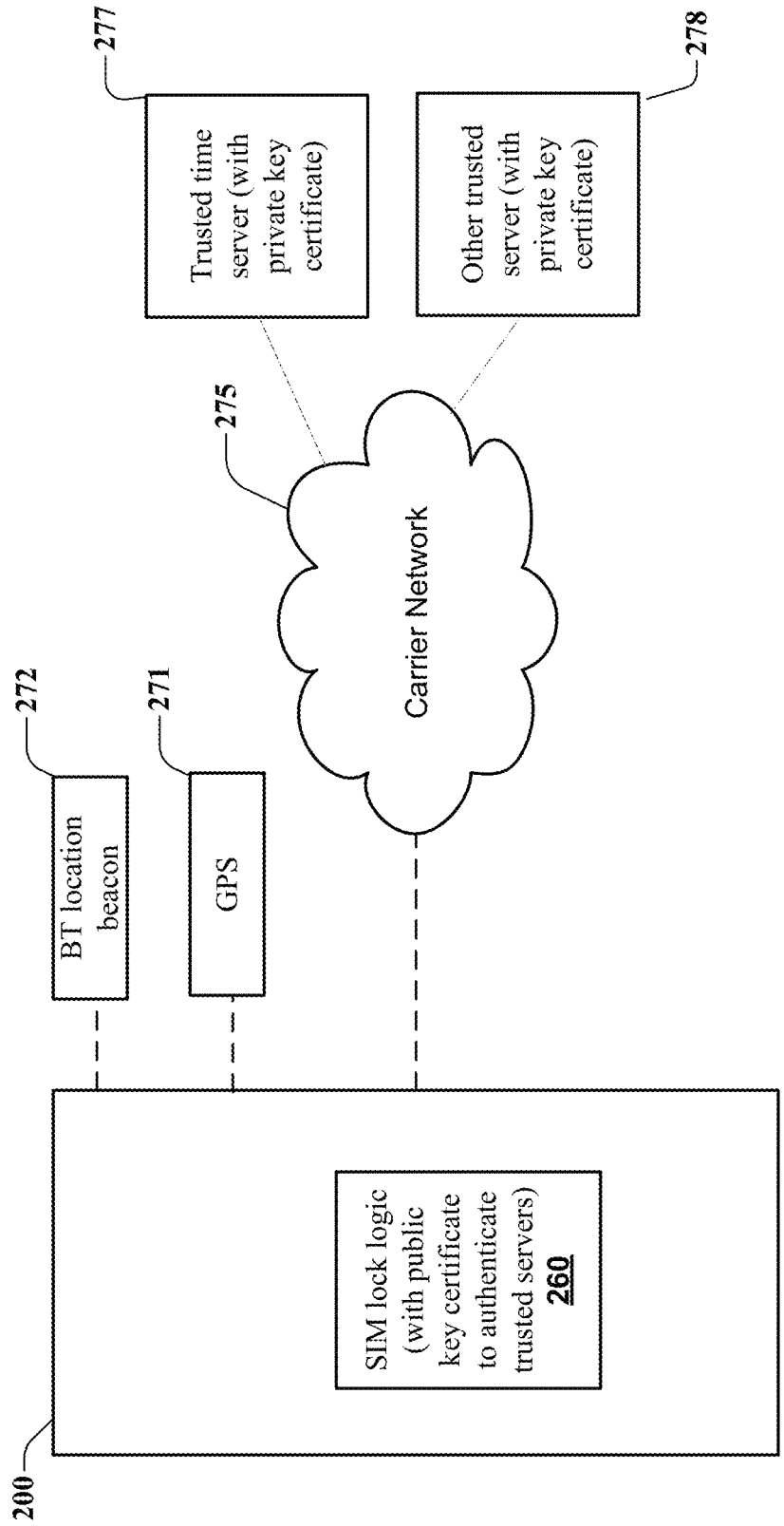
FIG. 2B is a block diagram illustrating an example, non-limiting embodiment of a system for implementing SIM lock logic that is functioning within the communication network of FIG. 1 in accordance with various aspects described herein.

FIG. 2B is a block diagram illustrating an example, non-limiting embodiment of a system for implementing SIM lock logic that is functioning within the communication network of FIG. 1 in accordance with various aspects described herein. As illustrated in FIG. 2B, system 270 comprises a wireless device 200 with SIM lock logic 260, and external factors such as a global positioning system (GPS) 271, a Bluetooth (BT) location beacon 272, a carrier network 275, a trusted time server 277, and another trusted server 278. Since some of the external factors depend on network connectivity (besides GPS 271 or BT location beacon 272), a qualifying and activated SIM card would be needed, which helps to ensure that the financial subsidy for device 200 would be fulfilled based on a determination that sufficient subscription time has passed.

SIM lock logic 260 can obtain time values from a trusted time server 277, where time is a factor in determining when the device determines that it is qualified to allow unlock. To prevent this input from being spoofed, the SIM lock logic 260 and the trusted time server 277 can be provisioned with authentication technology, such as private/public keys (PKI), which ensure that served time values can be authenticated by SIM lock logic 260. PKI keys/certificates ensure authenticity of the carrier server, but other authentication technology can be used to prevent spoofing of trusted servers, including asymmetric and/or symmetric key approaches that are broader in scope than PKI. The carrier server address and corresponding public key can be hardcoded in the secure logic of the device. Time values from a false source would be unable to form a value that passes the authentication check, and would be ignored by SIM lock logic 260. However, the carrier must provide a suitably configured trusted time server 277 that has keys paired with those manufactured into the wireless device 200. If SIM lock logic 260 includes contact with a trusted network time server that is only accessible via the carrier's cellular network, then the likelihood of fulfillment of the financial subsidy is increased.

Other trusted servers 278 can be used in an embodiment where no literal data exchange and confirmation of a completed unlock transaction may occur. But implicit information may be derived by a successful network touch using a secured protocol such as HTTPS. Thus, the wireless device can have rules that require successful secure connection setups at any required frequency. The connection setup does not require data payload exchange. Simply setting up a successfully authenticated connection on a known bearer is sufficient information. The wireless device can know that an active data account on the carrier network is in use. The wireless device can treat WiFi connections more strictly as non-qualifying, or they could be treated as qualifying under whatever embedded policy the device can use, e.g., if the WiFi network is known to be domestic or if it has assigned a permissible IP address from a known pool of IP addresses.

In an embodiment, the SIM lock logic can be further enhanced by adding network eligibility logic, again without any actual data payload exchange. The network can identify the subscriber account associated with the data connection. Network routing could refuse to route the connection request to the touched server or the touched server could refuse to handshake the secure connection setup request. The SIM lock logic on the wireless device periodically must successfully touch the carrier's server to keep the timer running towards expiration. If the user is not a qualified and known subscriber, based on the installed SIM card, or if the device is connecting from an invalid region, the handshake can be refused, thus influencing the accumulated eligibility determination at the device by way of persistently failing connections. This server capability would require real-time availability of qualified bearer information with routing/connection behavior, but the incoming subscriber identity and network are knowable.

The server could respond to the connection request by sending a particular certificate back to the device (or one that's not recognized), choosing a particular encryption cipher (or one that's unavailable at the client to cause a very distinct type of error), or by packing information in the returned HTTP header or in the body of the certificate. If the connection is established, the server could also respond with a redirect to a different URL where information is implied in the specified URL and/or in the reaction of that URL to the re-establishment of a new secure connection. All of these techniques are recognizable by the wireless device and can be inputs to the SIM lock logic to keep the internal timer running. These checks are all trusted because only the carrier's server would have the PKI certificates. An unsecure HTTP connection could be used to convey similar information, but there's no way for the wireless device to ensure that the messages are genuine or spoofed messages. Security would thus be very weak and easily faked in a hacker's unlocking lab. Some actual payload could be included in the connection request/response. The server could send some actual eligibility commands back to the device depending on the subscriber's unlock eligibility.

In another embodiment, simple messaging service (SMS) can be used as an alternative to a data connection. If the server has reliable information on the subscriber SIM that is sending a text message over the carrier's network, the carrier could provide an automatic response indicating compliance. The wireless device would similarly need to authenticate that the message is coming from the carrier (in this case, the device cannot check hard-to-forge PKI certificates). The carrier can exercise filtering/authentication to ensure that messages originate from a number that the phone trusts. If the device checks for the presence of the carrier's SIM card and a response from a hardcoded, trusted carrier network management system number (MSISDN) that the carrier network ensures can only originate from within the carrier network management system, such a check should be sufficiently trustworthy, and the internal timer in the SIM lock logic can be kept running.

Time values with a low level of trust can be obtained from carrier network 275 using the Network Identity and Time Zone (NITZ) standard, which is part of the larger 3GPP cellular protocol standards. However, NITZ standard time values are easy to spoof with commercially available lab simulators.

But even GPS 271 or BT location beacon 272 could play a role in the SIM lock logic 260. SIM lock logic 260 can look to GPS hardware for time that would normally be served from GPS 271. GPS 271 would be useful as another trusted time source that can factor into the calculation of the simple passage of time. However, a GPS time source can also be spoofed with lab simulators, but in combination with other sources would represent an additional barrier to cracking SIM lock logic 260. As is done in highly reliable and redundant systems such as spacecraft and aircraft navigation, separate systems run in parallel and cross-check each other. They continuously check for consistency and can make decisions based on majority vote logic. A hacker would have to simultaneously spoof all of them in the same way in the same time.

In an embodiment, GPS 271 can also enforce location logic that only accumulates qualifying usage while in a prescribed geographic area. Bluetooth connectivity to a qualifying BT location beacon 272 or peers could similarly serve as a strict location check. Thus, GPS 271 or BT location beacons 272 providing qualifying proximity checks can be part of SIM lock logic 260 as well.

In an embodiment, SIM lock logic 260 can utilize other touchable and authenticable servers. Servers can return thin amounts of information and/or affect their responses as a function of how the network assesses the qualifications of the subscriber status as determined by the SIM credentials in use.

In an embodiment, SIM lock logic 260 could use biometrics used to establish user-unique information that can be assessed as needed to determine eventual compliance with the qualifying criteria. Conceptually these would be similar to authenticating one's identity in order to meet qualifying criteria. For example, a fingerprint can be collected at first device boot. During normal usage, periodic checks of the user fingerprint can be made to make sure the device has not been transferred to another user. The unlock request, when it is eventually made of the device, can require that the original user make the request. While unusual in today's highly convenient and flexible device usage models that focus on one financially responsible party who is free to loan their device to anyone, these methods could find applicability in future use cases. Other user authentication factors in the 3-factor framework could also be gathered and checked. Biometrics represent a "who you are." A physical token (such as a digital fob or perhaps store and take a picture of an object that can be shown to the camera again for AI comparison) is an example of a "what you have" factor. And a password would be an example of a "what you know" factor.

Figure 2C:
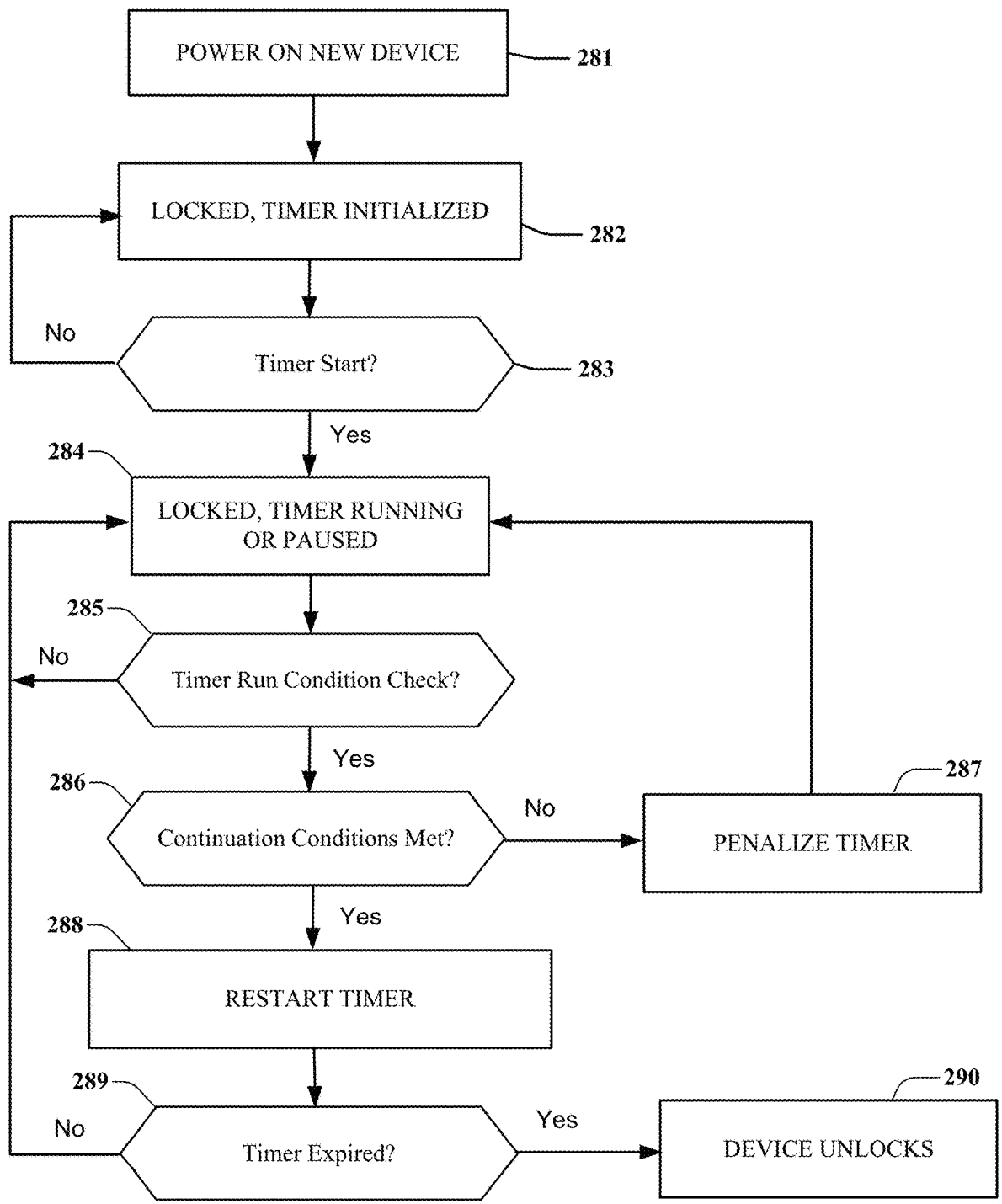
FIG. 2C depicts an illustrative embodiment of a method in accordance with various aspects described herein.

FIG. 2C depicts an illustrative embodiment of a method 280 in accordance with various aspects described herein. As shown in FIG. 2C, the method 280 begins at step 281, where a wireless device is turned on for the first time. Then, in step 282, the wireless device has an initial locked state, and an internal timer is initialized, but not started. Next, in step 283, conditions are checked to determine whether the timer should be started. These conditions include checking that the carrier's SIM card is installed in the wireless device, that the device has established a wireless connection with the carrier's network, and retrieving a time stamp from a trusted network server, as described above. Additional checks may include checking a country code, a GPS time check, a GPS location check, a Bluetooth location beacon check, or collecting biometric data such as a fingerprint, as described above. If any of the conditions are not met, the timer remains initialized, as illustrated by a return to step 282. However, if the conditions are met, the method proceeds to step 284.

In step 284, the wireless device remains locked, but the timer is either running or paused. The wireless device may provide full service only if the carrier's SIM card is installed within the device, and may provide emergency service otherwise. Next, in step 285, the wireless device determines whether to conduct a periodic check. Such periodic checks may be conditioned upon the passage of time, as determined by an offset from the last time stamp retrieved. In another embodiment, the internal timer is checked for a proper elapsed period. If the required period has not elapsed, then the method loops back to step 284. If the required period has elapsed, then the method proceeds to step 286.

In step 286, the SIM lock logic checks whether conditions are met to continue running the internal timer. These conditions may be the same as those initially checked in connection with step 283, or they may be different. For example, the conditions may be met if the carrier's SIM card is installed in the device and the device has a connection to the carrier's network. These extra checks deter shipment of devices to foreign countries by forcing devices to sit and be frequently connected to the carrier's network and satisfy other conditions for the duration of the timer before they can be unlocked. If these conditions are not met, then the process continues to step 287, where the wireless device may penalize the internal timer, by resetting the timer to the last elapsed time that the condition check satisfactorily passed, reinitializing the timer, and/or pausing the timer. The SIM lock logic may also check for a predetermined number of consecutive failures before imposing a penalty. The process continues by looping back to step 284. However, if the conditions in step 286 are met, the process continues at step 288.

In step 288, the SIM lock logic will restart the timer, if it is not running. Next, in step 289, the SIM lock logic checks to see whether the timer has expired. If not, then the process loops back to step 284. If the timer has expired, then the process continues to step 290.

In step 290, the SIM lock logic may either unlock the device automatically, or permit the device to be unlocked whenever a new SIM card is installed in the device. An unlock password may be required as well. Once unlocked, the device will provide full service with any SIM card. The process ends at step 290.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, and method 280 presented in FIGS. 1, 2A, 2B, 2C, and 3. For example, virtualized communication network 300 can facilitate in whole or in part communication paths to trusted network servers.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
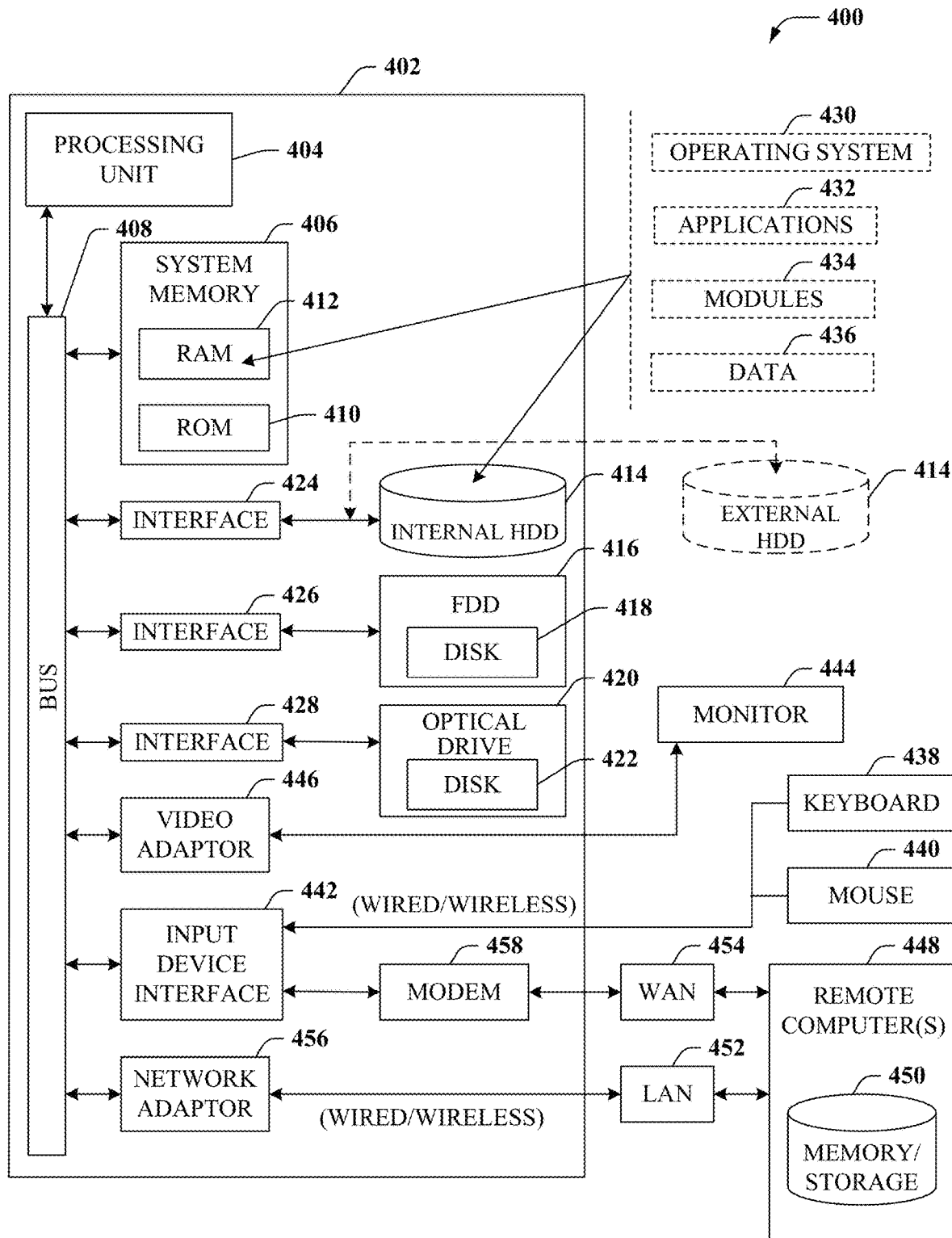
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part the SIM lock logic.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
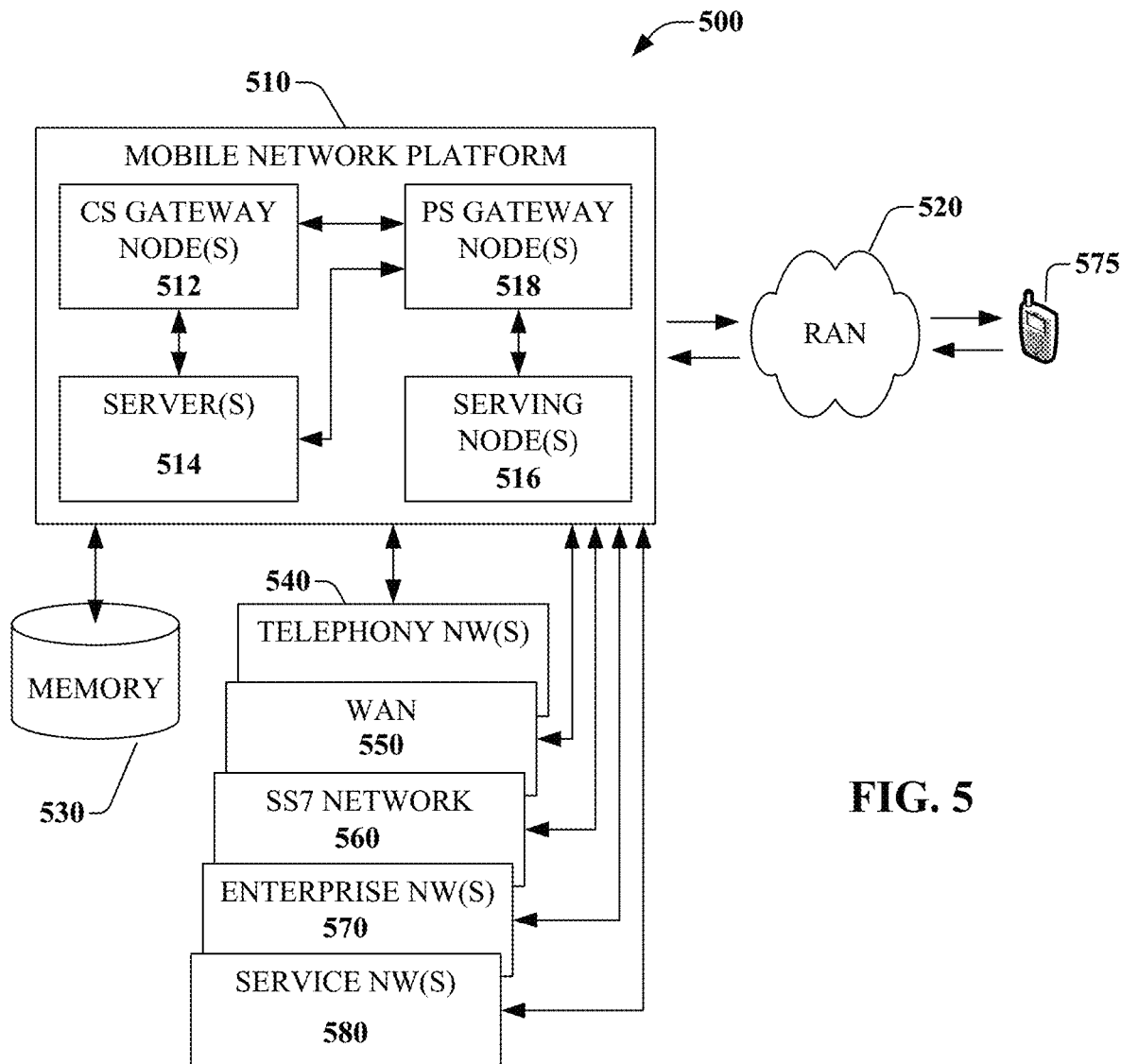
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part the wireless device 200. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
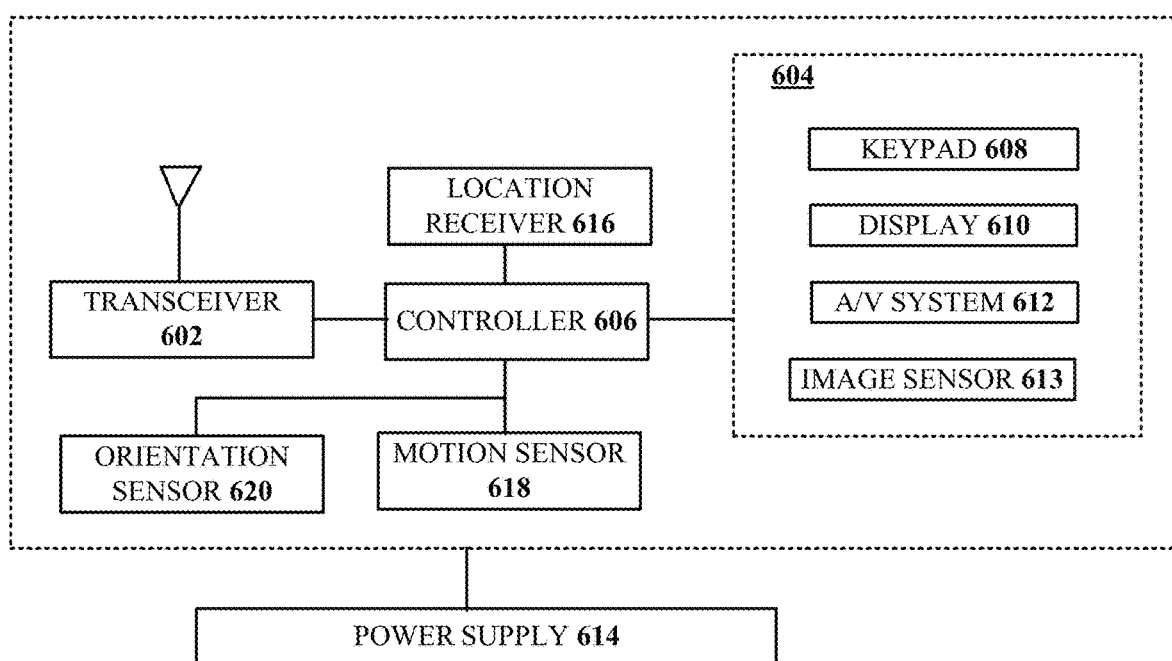
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part the modem 210, the application processor 220, or other subsystems of the wireless device 200.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A wireless device, comprising:
a processing system including a processor; and
a memory that stores executable instructions that, when executed by the processing system, facilitate performance of operations, the operations comprising:
determining whether a valid subscriber identification module (SIM) card is installed in the wireless device;
detecting, from a location beacon of the wireless device, a location of the wireless device;
starting a timer responsive to determining that the valid SIM card is installed in the wireless device and responsive to detecting the location to be within a permitted geographic region; and
continuing to permit the timer to count down responsive to both a further determination that the valid SIM card remains installed in the wireless device and a further detection that the location remains within the permitted geographic region, wherein expiry of the timer allows a SIM lock to be unlocked for the wireless device to provide service with a different installed SIM card.

2. The wireless device of claim 1, wherein the operations further comprise penalizing the timer responsive to any determination that the valid SIM card is no longer installed in the wireless device or any detection of the location being outside of the permitted geographic region.

3. The wireless device of claim 2, wherein the penalizing the timer comprises resetting the timer.

4. The wireless device of claim 2, wherein the penalizing the timer comprises pausing the timer.

5. The wireless device of claim 1, wherein the memory comprises a secure memory, and wherein values for the timer are stored in the secure memory.

6. The wireless device of claim 5, wherein the wireless device comprises a modem, and wherein the secure memory is located in the modem.

7. The wireless device of claim 1, wherein the valid SIM card comprises a carrier identity that matches a carrier identity stored in the memory.

8. The wireless device of claim 1, wherein unlocking the SIM lock permits the wireless device to provide full service with any installed SIM card.

9. The wireless device of claim 1, wherein the operations further comprise obtaining biometric data and comparing the biometric data with previously stored biometric data.

10. The wireless device of claim 9, wherein the operations further comprise penalizing the timer responsive to a determination that the biometric data does not match the previously stored biometric data.

11. A non-transitory machine-readable medium in a secure area of a wireless device, comprising executable instructions that, when executed by a processing system including a processor, facilitate performance of operations, the operations comprising:
  determining whether a carrier identity of a subscriber identification module (SIM) card installed in the wireless device matches carrier identity information stored in the secure area;
  detecting a location of the wireless device;
  starting a timer responsive to determining that the carrier identity matches the carrier identity information and responsive to detecting the location to be within a permitted geographic region; and
  continuing to permit the timer to count down responsive to both a further determination that the carrier identity matches the carrier identify information and a further detection that the location is within the permitted geographic region, wherein expiry of the timer allows a SIM lock embedded in the secure area to be unlocked for the wireless device to provide service with a different installed SIM card.

12. The non-transitory machine-readable medium of claim 11, wherein unlocking the SIM lock permits the wireless device to provide full service with any installed SIM card.

13. The non-transitory machine-readable medium of claim 11, wherein the operations further comprise determining that the location of the wireless device is outside of a predetermined range, and penalizing the timer based on the determining that the location of the wireless device is outside of the predetermined range.

14. The non-transitory machine-readable medium of claim 11, wherein the operations further comprise determining that the location of the wireless device is within a predetermined range, and not penalizing the timer based on the determining that the location of the wireless device is within the predetermined range.

15. The non-transitory machine-readable medium of claim 11, wherein the operations further comprise obtaining biometric data, comparing the biometric data with previously stored biometric data, and penalizing the timer responsive to a determination that the biometric data does not match the previously stored biometric data.

16. A method, comprising:
  determining, by a processing system of a wireless device including a processor, whether a valid subscriber identification module (SIM) card is installed in the wireless device;
  detecting, by the processing system, a location of the wireless device;
  starting, by the processing system, a timer responsive to determining that the valid SIM card is installed in the wireless device and responsive to detecting the location to be within a permitted geographic region; and
  continuing to permit, by the processing system, the timer to count down responsive to both a further determination that the valid SIM card remains installed in the wireless device and a further detection that the location is within the permitted geographic region, wherein expiry of the timer allows a SIM lock to be unlocked for the wireless device to provide service with a different installed SIM card.

17. The method of claim 16, wherein unlocking the SIM lock permits the wireless device to provide full service with any installed SIM card.

18. The method of claim 16, wherein values for the timer are stored in a secure memory.

19. The method of claim 16, wherein the valid SIM card comprises a carrier identity that matches a carrier identity stored in a secure memory.

20. The method of claim 16, further comprising obtaining biometric data, comparing the biometric data with previously stored biometric data, and pausing the timer responsive to a determination that the biometric data does not match the previously stored biometric data.

* * * * *